United States Patent
Moon et al.

(10) Patent No.: US 9,178,204 B2
(45) Date of Patent: Nov. 3, 2015

(54) RECHARGEABLE BATTERY

(75) Inventors: Jong-Seok Moon, Yongin-si (KR);
Seok-Yoon Yoo, Yongin-si (KR);
Chi-Young Lee, Yongin-si (KR);
Yoon-Tai Kwak, Yongin-si (KR);
Yong-Sam Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 374 days.

(21) Appl. No.: 12/957,235

(22) Filed: Nov. 30, 2010

(65) Prior Publication Data

US 2011/0136000 A1 Jun. 9, 2011

Related U.S. Application Data

(60) Provisional application No. 61/267,354, filed on Dec. 7, 2009.

(51) Int. Cl.
| | |
|---|---|
| *H01M 2/34* | (2006.01) |
| *H01M 2/26* | (2006.01) |
| *H01M 2/02* | (2006.01) |
| *H01M 2/04* | (2006.01) |
| *H01M 10/04* | (2006.01) |
| *H01M 2/18* | (2006.01) |

(52) U.S. Cl.
CPC ............ *H01M 2/263* (2013.01); *H01M 2/0285* (2013.01); *H01M 2/0473* (2013.01); *H01M 2/34* (2013.01); *H01M 10/0431* (2013.01); *H01M 2/18* (2013.01)

(58) Field of Classification Search
None
See application file for complete search history.

(56) References Cited

U.S. PATENT DOCUMENTS

| | | | |
|---|---|---|---|
| 5,989,743 | A | 11/1999 | Yamashita |
| 7,060,388 | B2 | 6/2006 | Naruoka |
| 7,781,095 | B2 | 8/2010 | Cho et al. |
| 7,824,794 | B2 | 11/2010 | Kim |

(Continued)

FOREIGN PATENT DOCUMENTS

| | | |
|---|---|---|
| CN | 1407648 A | 4/2003 |
| CN | 1656631 A | 8/2005 |

(Continued)

OTHER PUBLICATIONS

Machine translation of JP2001-68161.*

(Continued)

*Primary Examiner* — Maria J Laios
(74) *Attorney, Agent, or Firm* — Christie, Parker & Hale, LLP

(57) ABSTRACT

A rechargeable battery includes: a case; an electrode assembly housed in the case and including a first electrode, a second electrode, and a separator between the first electrode and the second electrode, the first electrode having a coated portion coated with a first active material and an uncoated portion absent the first active material; a safety assembly including a first electric conductive plate and a first supporting protrusion extending from the first electric conductive plate and physically coupled to the uncoated portion; a current collecting tab electrically coupling the electrode assembly with the terminal and physically coupled to the uncoated portion; and a first auxiliary plate physically coupled to the uncoated portion at a surface of the uncoated portion opposite to where the first supporting protrusion is physically coupled to the uncoated portion.

16 Claims, 11 Drawing Sheets

(56) References Cited

U.S. PATENT DOCUMENTS

| | | | |
|---|---|---|---|
| 7,879,477 B2 | 2/2011 | Seo et al. | |
| 2003/0044677 A1* | 3/2003 | Naruoka | 429/161 |
| 2005/0287429 A1 | 12/2005 | Cho et al. | |
| 2006/0024578 A1 | 2/2006 | Lee | |
| 2006/0051664 A1 | 3/2006 | Tasai et al. | |
| 2006/0159990 A1* | 7/2006 | Ryu et al. | 429/176 |
| 2006/0208700 A1 | 9/2006 | Kim et al. | |
| 2006/0257732 A1 | 11/2006 | Yageta et al. | |
| 2006/0263682 A1 | 11/2006 | Kim | |
| 2009/0035651 A1 | 2/2009 | Hirose et al. | |
| 2009/0104525 A1 | 4/2009 | Nakagawa et al. | |
| 2009/0136842 A1 | 5/2009 | Hirota | |
| 2010/0159315 A1* | 6/2010 | Imasaka et al. | 429/120 |
| 2010/0203371 A1 | 8/2010 | Nagai et al. | |
| 2012/0021267 A1 | 1/2012 | Tasai et al. | |

FOREIGN PATENT DOCUMENTS

| | | | | |
|---|---|---|---|---|
| CN | 1713441 A | 12/2005 | | |
| CN | 101190976 A | 10/2008 | | |
| JP | 08-153542 | 6/1996 | | |
| JP | 2000-150306 | 5/2000 | | |
| JP | 2000-223109 | 8/2000 | | |
| JP | 2001-038475 | 2/2001 | | |
| JP | 2001-68161 | * | 3/2001 | H01M 10/40 |
| JP | 2002-270239 A | * | 3/2001 | H01M 10/40 |
| JP | 2001-313012 | 11/2001 | | |
| JP | 2001-351670 | 12/2001 | | |
| JP | 2003-142068 | 5/2003 | | |
| JP | 2003-249419 | 9/2003 | | |
| JP | 2003-346769 | 12/2003 | | |
| JP | 2003-346770 | 12/2003 | | |
| JP | 2004-111300 | 4/2004 | | |
| JP | 2006-156401 | 6/2006 | | |
| JP | 2006-269425 | 10/2006 | | |
| JP | 2006-527474 | 11/2006 | | |
| JP | 2009-026705 | 2/2009 | | |
| KR | 10-2006-0106373 | 10/2006 | | |
| KR | 10-0669435 B1 | 1/2007 | | |
| KR | 10-2007-0113039 | 11/2007 | | |
| KR | 10-2008-0005621 | 1/2008 | | |
| WO | WO2009/041136 A1 | * | 4/2009 | H01M 10/40 |

OTHER PUBLICATIONS

Japanese Office action dated Oct. 23, 2012, for corresponding Japanese Patent application 2010-272938, (2 pages).
Patent Abstracts of Japan, and English machine translation of Japanese Publication JP 08-153542 listed above, (29 pages).
Patent Abstracts of Japan, and English machine translation of Japanese Publication JP 2003-346769 listed above, (10 pages).
Patent Abstracts of Japan, and English machine translation of Japanese Publication JP 2003-346770 listed above, (13 pages).
Patent Abstracts of Japan, and English machine translation of Japanese Publication JP 2004-111300 listed above (13 pages).
Patent Abstracts of Japan, and English machine translation of Japanese Publication JP 2006-156401 listed above (14 pages), and corresponds to U.S. Pat. No. 7,824,794.
European Search Report dated Mar. 19, 2012, for European Patent application 10193949.4, 5 pages.
European Search Report dated Mar. 21, 2012, for corresponding European Patent application 10193938.7, 5 pages.
U.S. Office action dated Feb. 1, 2012, for cross reference U.S. Appl. No. 12/959,328, 17 pages.
U.S. Advisory Action dated Apr. 10, 2012, for cross reference U.S. Appl. No. 12/959,328, (3 pages).
KIPO Office action dated May 1, 2012, for corresponding Korean Patent application 10-2010-0123779, (4 pages).
European Office action dated Aug. 9, 2012, for corresponding European Patent application 10193949.4, (4 pages).
KIPO Notice of Allowance dated Sep. 27, 2012, for corresponding Korean Patent application 10-2010-0122220, (5 pages).
Patent Abstracts of Japan, and English machine translation of Japanese Publication 2001-313012 listed above, (5 pages).
Korean Patent Abstracts of Korean Publication 10-2006-0106373, corresponding to Korean Patent 10-0669435 listed above.
U.S. Office action dated Sep. 14, 2011, for cross-reference U.S. Appl. No. 12/959,328, 14 pages.
Japanese Office action dated Dec. 25, 2012, for corresponding Japanese Patent application 2010-271770, (3 pages).
SIPO Office action dated Dec. 26, 2012, for Chinese Patent application 20100585749.9, with English translation, (14 pages).
Patent Abstracts of Japan, and English machine translation of Japanese Publication 2000-150306 listed above, (14 pages).
Patent Abstracts of Japan, and English machine translation of Japanese Publication 2000-223109 listed above, (6 pages).
Patent Abstracts of Japan, and English machine translation of Japanese Publication 2001-038475 listed above, (11 pages).
Patent Abstracts of Japan, and English machine translation of Japanese Publication 2001-351670 listed above, (6 pages).
Patent Abstracts of Japan, and English machine translation of Japanese Publication 2003-142068 listed above, (14 pages).
Patent Abstracts of Japan, and English machine translation of Japanese Publication 2003-249419 listed above, (18 pages).
EP Search Report dated Jan. 28, 2011, for EP 10193949.4, in the name of SB LiMotive Co., Ltd.
EP Search Report dated Jan. 31, 2011 for EP 10193938.7, in the name of SB LiMotive Co., Ltd.
SIPO Office action dated Mar. 3, 2013, of corresponding Chinese Patent application 201010580762.5, with English translation, (20 pages).
U.S. Office action dated Jul. 18, 2013, for cross reference U.S. Appl. No. 12/959,328, (23 pages).
SIPO Office action dated Aug. 19, 2013, with English translation, for Chinese Patent application 201010585749.9, (8 pages).
U.S. Office action dated Nov. 6, 2014, for cross reference U.S. Appl. No. 12/959,328, (17 pages).
U.S. Office Action dated Jan. 15, 2015, for cross reference U.S. Appl. No. 12/959,328 (4 pages).
U.S. Office action dated Nov. 26, 2013, for cross reference U.S. Appl. No. 12/959,328, (16 pages).
U.S. Advisory dated Jan. 30, 2014, for cross reference U.S. Appl. No. 12/959,328, (2 pages).
SIPO Certificate of Patent dated Apr. 8, 2015, with English translation of cover page only, corresponding to Chinese Patent application 201010585749.9, (13 pages).
U.S. Office action dated Apr. 7, 2015, for cross reference U.S. Appl. No. 12/959,328, (14 pages).
SIPO Office action dated Aug. 19, 2014, with English translation, for Chinese Patent application 201010585749.9, (12 pages).
U.S. Office action dated Jul. 18, 2014, for cross reference U.S. Appl. No. 12/959,328, (17 pages).
SIPO Office action dated Sep. 10, 2013, with English translation, for Chinese Patent application 201010580762.5, (6 pages).
SIPO Office action dated Feb. 17, 2014, with English translation, for Chinese Patent application 201010585749.9, (10 pages).

\* cited by examiner

RECHARGEABLE BATTERY

CROSS-REFERENCE TO RELATED APPLICATIONS

This application claims priority to and the benefit of U.S. Provisional Application No. 61/267,354, filed on Dec. 7, 2009, in the United States Patent and Trademark Office, the entire content of which is incorporated herein by reference.

BACKGROUND

1. Field

One or more embodiments of the present invention relate to a rechargeable battery. More particularly, one or more embodiments of the present invention relate to a rechargeable battery with a safety device having an improved structure.

2. Description of the Related Art

A rechargeable battery is a battery that can be charged and discharged, which is different from a primary battery, which is not rechargeable. A rechargeable battery with low capacity can be used for small portable electronic devices such as mobile phones, laptop computers, and camcorders. On the other hand, a rechargeable battery with high capacity can be used as a power source for driving a motor of a hybrid electric automobile and the like, or as a large-capacity power storage device.

A high power rechargeable battery using a non-aqueous electrolyte of high energy density has been recently developed. A plurality of these rechargeable batteries can be coupled in series to form a large capacity battery module so that the high power rechargeable battery may be used to drive a device requiring high power (e.g., a motor in an electric vehicle). The rechargeable battery can be formed in a cylindrical or rectangular shape.

If a conductive foreign object, such as a nail or a screw, enters the rechargeable battery from the outside, a short circuit may occur in the rechargeable battery. In the event of a short circuit, the internal temperature of the rechargeable battery may sharply rise and the rechargeable battery may ignite or explode.

Moreover, a positive or negative electrode uncoated portion of the rechargeable battery is generally made of a very thin sheet metal, and this may cause the positive or negative electrode uncoated portion to be torn or to stick to a current collecting tab during the process of welding the current collecting tab having a large thickness (or a thick current collecting tab) to the positive or negative electrode uncoated portion.

The above information disclosed in this Background section is only for enhancement of understanding of the background of the invention and therefore it may contain information that does not form the prior art that is already known in this country to a person of ordinary skill in the art.

SUMMARY

An aspect of an embodiment of the present invention is directed toward a rechargeable battery with improved safety. Another aspect of the present invention provides a rechargeable battery that is easy to manufacture. Another aspect of the present invention provides a rechargeable battery with improved safety.

One embodiment of the present invention is directed toward a rechargeable battery including: a case; an electrode assembly housed in the case and including a first electrode, a second electrode, and a separator between the first electrode and the second electrode, the first electrode having a coated portion coated with a first active material and an uncoated portion absent the first active material; a cap assembly physically coupled to the case and including a terminal electrically coupled to the electrode assembly; a safety assembly including a first electric conductive plate and a first supporting protrusion extending from the first electric conductive plate and physically coupled to the uncoated portion; a current collecting tab electrically coupling the electrode assembly with the terminal and physically coupled to the uncoated portion; and a first auxiliary plate physically coupled to the uncoated portion at a surface of the uncoated portion opposite to where the first supporting protrusion is physically coupled to the uncoated portion.

The electrode assembly may have a flat surface and a curved surface, the first electric conductive plate may be on the flat surface, and the cap assembly may be on the curved surface, wherein the current collecting tab includes a support extending along a first direction on the curved surface and a first plate extending from the support along a second direction on a side edge of the electrode assembly.

The current collecting tab may further include a second plate extending from the first plate along the first direction on a side surface of the uncoated portion extending from the flat surface.

The first direction may be perpendicular to the second direction.

The first electric conductive plate may be composed of a same material as that of the first electrode.

The first auxiliary plate may be composed of a same material as that of the first electrode.

The first auxiliary plate may be positioned to oppose the current collecting tab with the uncoated portion therebetween.

The first supporting protrusion may be physically coupled to the uncoated portion at a surface of the uncoated portion opposite to where the current collecting tab may be physically coupled to the uncoated portion and positioned to oppose the current collecting tab with the uncoated portion therebetween.

The first supporting protrusion may include a plurality of supporting portions.

The supporting portions may define a cut out region therebetween.

The first auxiliary plate may be positioned to oppose the current collecting tab at the cut out region with the uncoated portion therebetween.

The safety assembly may further include: a second electric conductive plate, the second electric conductive plate being between the electrode assembly and the first electric conductive plate.

The rechargeable battery may further include a second auxiliary plate, wherein the second electrode has a coated portion coated with a second active material and an uncoated portion absent the second active material, and wherein the second auxiliary plate is physically coupled to the uncoated portion of the second electrode.

The second auxiliary plate may be composed of a same material as that of the second electrode.

The second auxiliary plate may be composed of a different material than that of the first auxiliary plate.

The safety assembly may further include a second supporting protrusion integrally provided with the second electric conductive plate to extend from the second electric conductive plate and to be physically coupled to the uncoated portion of the second electrode.

The rechargeable battery may further include: a second electric conductive plate, wherein the electrode assembly is between the second electric conductive plate and the first electric conductive plate.

The rechargeable battery may further include: a third electric conductive plate, and a fourth electric conductive plate, wherein the third electric conductive plate is between a first side of the electrode assembly and the first electric conductive plate; and the fourth electric conductive plate is between a second side of the electrode assembly and the second electric conductive plate.

The electrode assembly may include a plurality of electrode assemblies.

The current collecting tab may be between the first electric conductive plate and the second electric conductive plate. The safety assembly may further include a second supporting protrusion integrally provided with the second electric conductive plate to extend from the second electric conductive plate and to be physically coupled to the uncoated portion of the first electrode.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
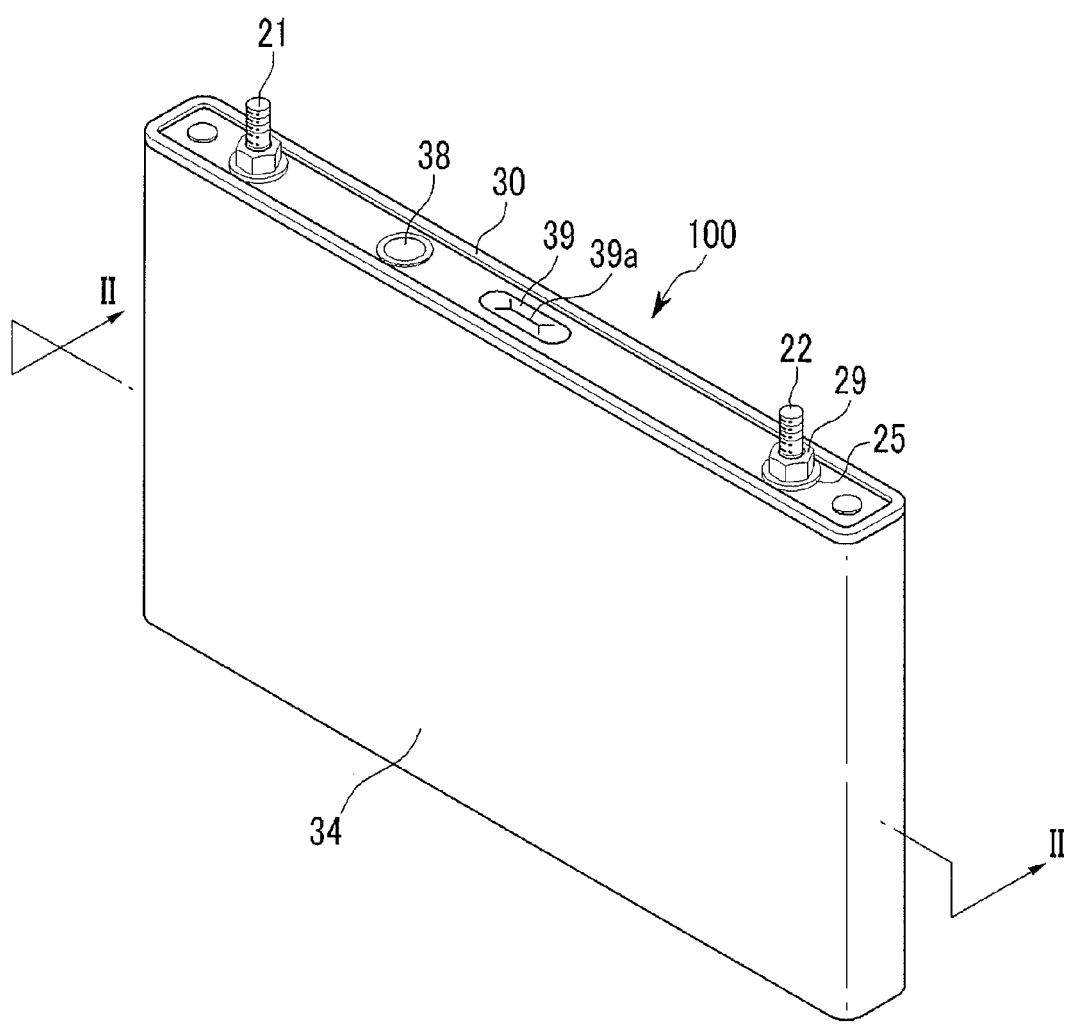
FIG. 1 is a perspective view illustrating a rechargeable battery according to a first exemplary embodiment of the present invention.

Exemplary embodiments of the present invention will be described more fully hereinafter with reference to the accompanying drawings. As those skilled in the art would realize, the described embodiments may be modified in various different ways, all without departing from the spirit or scope of the present invention. In the specification and drawings, like reference numerals indicate like components.

Figure 2:
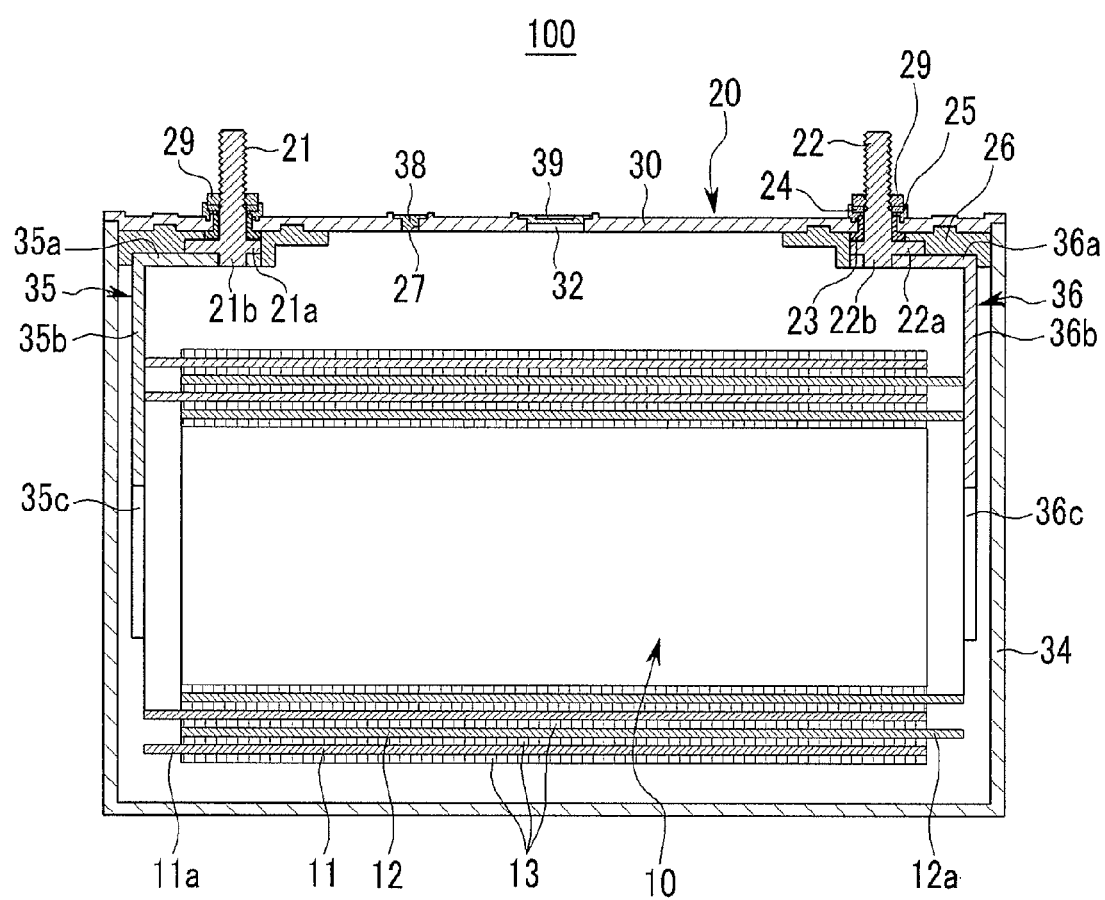
FIG. 2 is a cross-sectional view taken along line II-II in FIG. 1.

FIG. 1 is a perspective view illustrating a rechargeable battery according to a first exemplary embodiment of the present invention, and FIG. 2 is a cross-sectional view taken along line II-II in FIG. 1.

Referring to FIG. 1 and FIG. 2, a rechargeable battery 100 according to the first exemplary embodiment includes a plurality of electrode assemblies 10, each being wound with a separator 13 interposed between a positive electrode 11 and a negative electrode 12, a case 34 accommodating (or housing) the electrode assemblies 10, and a cap assembly 20 coupled to the opening of the case 34.

The rechargeable battery 100 according to the first exemplary embodiment will be described as a rectangular lithium-ion secondary battery as an example. However, embodiments of the present invention are not limited thereto, and may be applied to batteries having various suitable shapes including a lithium polymer battery and a cylindrical battery.

The positive electrode 11 has a structure where a positive electrode active material is applied on a positive electrode current collector made of a metal such as aluminum, and includes a positive electrode coated portion that is coated with the positive electrode active material on the positive electrode current collector and a positive electrode uncoated portion 11a that is not coated with (or absent) the positive electrode active material thereon.

The negative electrode 12 has a structure where a negative electrode active material is applied on a negative electrode current collector made of a thin metal foil such as copper, and includes a negative electrode coated portion that is coated with the negative electrode active material on the negative electrode current collector and a negative electrode uncoated portion 12a that is not coated with (or absent) the negative electrode active material.

The positive electrode uncoated portion 11a is formed at one end of the positive electrode 11 on one side in the longitudinal direction of the positive electrode 11, and the negative electrode uncoated portion 12a is formed at one end of the negative electrode 12 on the other side in the longitudinal direction of the negative electrode 12. The positive electrode 11 and the negative electrode 12 are wound after having the separator 13 serving as an insulator interposed therebetween. A finishing tape (not shown) supporting the shape of the electrode assembly 10 may be attached to an outer surface of the electrode assembly 10. The electrode assembly 10 is made into an approximately plate-like shape by being pressed after being wound. A curved surface 10b is positioned on the top and bottom edges and flat surfaces 10a positioned between the curved surfaces 10b are formed on the outer circumference of the electrode assembly 10 (as shown, e.g., in FIG. 3).

However, embodiments of the present invention are not limited thereto, and the above electrode assembly 10 may have a structure where the positive and negative electrodes include a plurality of sheets which are alternately stacked with a separator (or separators) interposed therebetween.

The case 34 has an approximately cuboid (or cubical) shape, and is provided with an opening on one face thereof. The cap assembly 20 includes a cap plate 30 covering the opening of the case 34, a positive electrode terminal 21 protruding outward from the cap plate 30 and electrically connected to the positive electrode 11, a negative electrode terminal 22 protruding outward from the cap plate 30 and electrically connected to the negative electrode 12, and a vent member 39 having a notch 39a so as to be broken depending on an internal pressure (e.g., a set internal pressure).

The cap plate 30 is formed as a thin plate. The cap plate 30 includes an electrolyte injection hole 27 formed at one side thereof to inject an electrolyte, and a stopper 38 mounted on the electrolyte injection hole 27.

An upper gasket 25 and a lower gasket 23 are mounted between the cap plate 30 and the terminals 21 and 22 to insulate the cap plate 30 from the terminals 21 and 22. In one embodiment, the terminals 21 and 22 include the positive electrode terminal 21 and the negative electrode terminal 22.

The terminals 21 and 22 have a cylindrical shape. A nut 29 is mounted on each of the terminals 21 and 22 to support the terminals 21 and 22 at an upper portion thereof, and a screw thread is formed on the outer circumference of each of the terminals 21 and 22 so as to be engaged with the nut 29. A washer 24 for buffering a fastening force is provided between the nut 29 and the gasket 25. Terminal flanges 21a and 22a supporting the terminals 21 and 22 and lower protrusions 21b and 22b protruding downward from the terminal flanges 21a and 22a are formed on the lower ends of the terminals 21 and 22.

A lower insulation member 26 for insulation is provided between the terminal flanges 21a and 22a and the cap plate 30, and the terminal flanges 21a and 22a are inserted into the lower insulation member 26. A positive electrode current collecting tab 35 electrically connected to the positive electrode 11 is attached to the lower protrusion 21b by welding, and a negative electrode current collecting tab 36 electrically connected to the negative electrode 12 is attached to the lower protrusion 22b by welding. The terminal flanges 21a and 22a and the current collecting tabs 35 and 36 are fitted into grooves formed on the lower surface of the lower insulating member 26.

Figure 3:
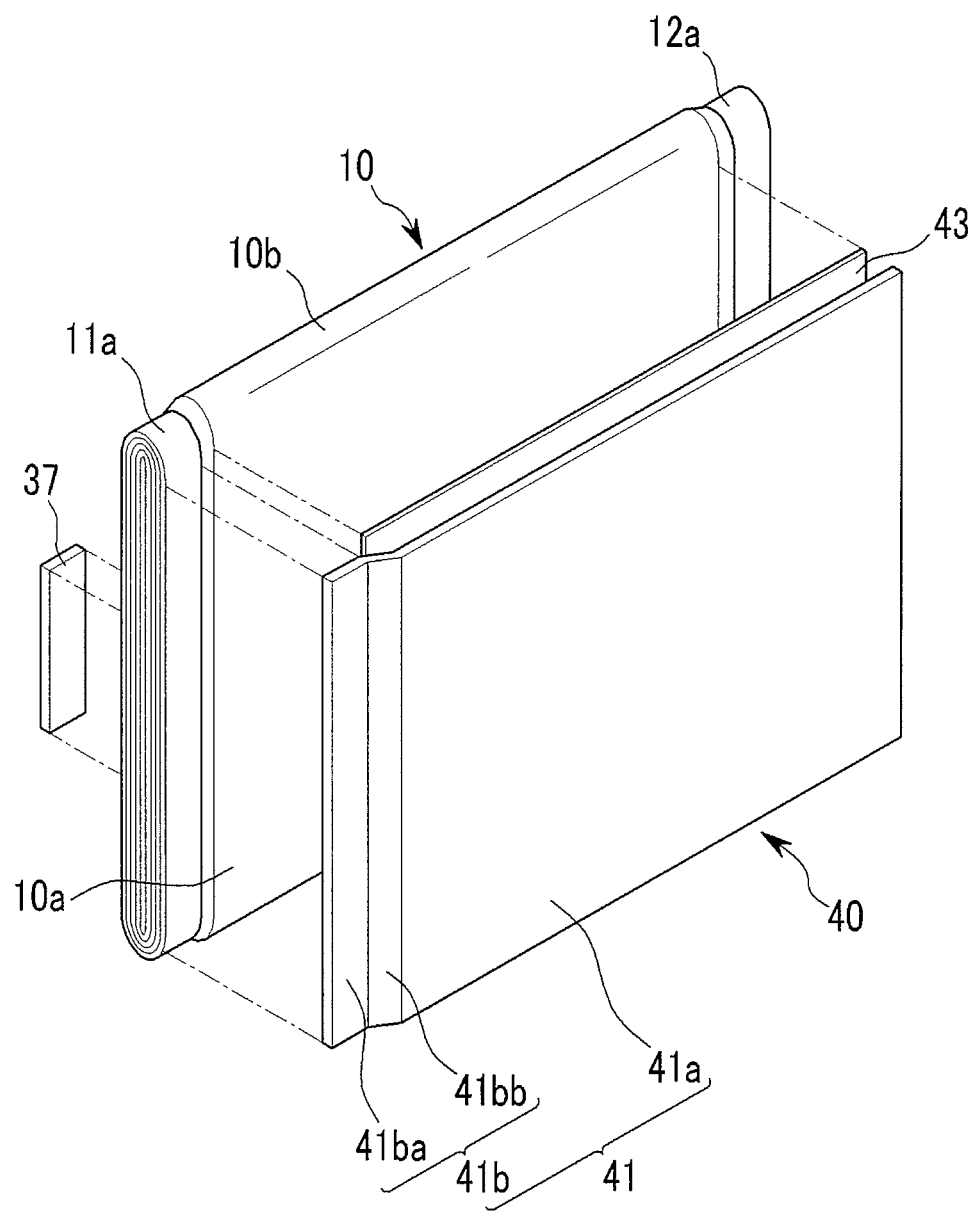
FIG. 3 is an exploded perspective view illustrating an electrode assembly and a safety member according the first exemplary embodiment of the present invention.

FIG. 3 is an exploded perspective view illustrating an electrode assembly and a safety member according to the first exemplary embodiment of the present invention.

Referring to FIG. 3, the safety member 40 includes a first metal plate 41 electrically connected to the positive electrode 11, and a first film 43 disposed between the first metal plate 41 and the electrode assembly 10.

The first metal plate 41 is closely contacted with the flat surface 10a of the electrode assembly 10. The first metal plate 41 is attached to the positive electrode uncoated portion 11a by welding.

Although the first exemplary embodiment has been described with respect to the case where the first metal plate 41 is attached to the positive electrode uncoated portion 11a by welding, embodiments of the present invention are not limited thereto, and the first metal plate 41 may be attached to the negative electrode uncoated portion 12a by welding.

The first metal plate 41 may be made of aluminum which is the same material as the positive electrode current collector. The first film 43 may be made of an electrically insulating polymer material.

The first metal plate 41 includes a flat plate portion 41a in close contact with the flat surface 10a of the electrode assembly 10 and a supporting protrusion 41b protruding from a side edge of the flat plate portion 41a (see, e.g., FIG. 3).

The flat plate portion 41a has a rectangular plate-like shape, and has a width corresponding to that of the flat surface 10a of the electrode assembly 10.

The supporting protrusion 41b includes a welded portion 41ba attached to the positive electrode uncoated portion 11a by ultrasonic welding, etc., and a joining portion 41bb formed between the flat plate portion 41a and the welded portion 41ba. The welded portion 41ba is pre-welded to the positive electrode uncoated portion 11a to support the positive electrode uncoated portion 11a.

The positive electrode uncoated portion 11a consists of a plurality of thin metal films having low strength. If the positive electrode uncoated portion 11a is fixed to the supporting protrusion 41b by welding, the thin metal films of the positive electrode uncoated portions 11a can be densely arranged, thus rapidly transferring welding heat to the stacked thin metal films of the positive electrode uncoated portions 11a. If the thin metal films of the positive electrode uncoated portions 11a are not densely arranged and the gaps between the thin metal films of the positive electrode uncoated portions 11a are large, heat is concentrated only on some of the thin metal films of the positive electrode uncoated portions 11a, and as a result, the thin metal films of the positive electrode uncoated portions may be stuck together or the stacked thin metal films of the positive electrode uncoated portions 11a may not be bonded together over their whole area.

The joining portion 41bb is formed inclined toward the inside of the electrode assembly 10, and supports the positive electrode uncoated portion 11a. The positive electrode uncoated portion 11a has a smaller thickness than that of the positive electrode coated portion, so the positive electrode uncoated portion 11a is formed inclined at a region adjacent to the positive electrode coating portion, and the joining portion 41bb supports the inclined region of the positive electrode uncoated portion 11a.

In the electrode assembly 10, an auxiliary plate 37 is provided on the opposite surface to the first metal plate 41 is attached. The auxiliary plates 37 are pre-welded to the positive electrode uncoated portion 11a.

If a conductive foreign object such as a nail or a screw enters the rechargeable battery 100 from the outside, the positive electrode 11 and the negative electrode 12 are short circuited by the conductive foreign object and this may generate much heat and ignite or explode the rechargeable battery.

However, in the case that the safety member 40 is provided as in the first exemplary embodiment, the first metal plate 41 is short circuited from the negative electrode 12, thereby safely discharging stored current without ignition (e.g., such that the short circuit occurs across the safety plate and outside of the electrode assembly).

As such, according to the first exemplary embodiment, when there is a risk of short circuit due to the intrusion of a conductive foreign object from the outside, the risk of ignition is eliminated by discharging current, thus improving the safety of the rechargeable battery 100.

In another embodiment, the safety member may be configured to be connected electrically to the negative electrode and the case may be configured to be connected electrically to the positive electrode. Thus, the case connected to the positive electrode may be short-circuited to the safety member connected to the negative electrode when the conductive foreign object enters the rechargeable battery.

Figure 4:
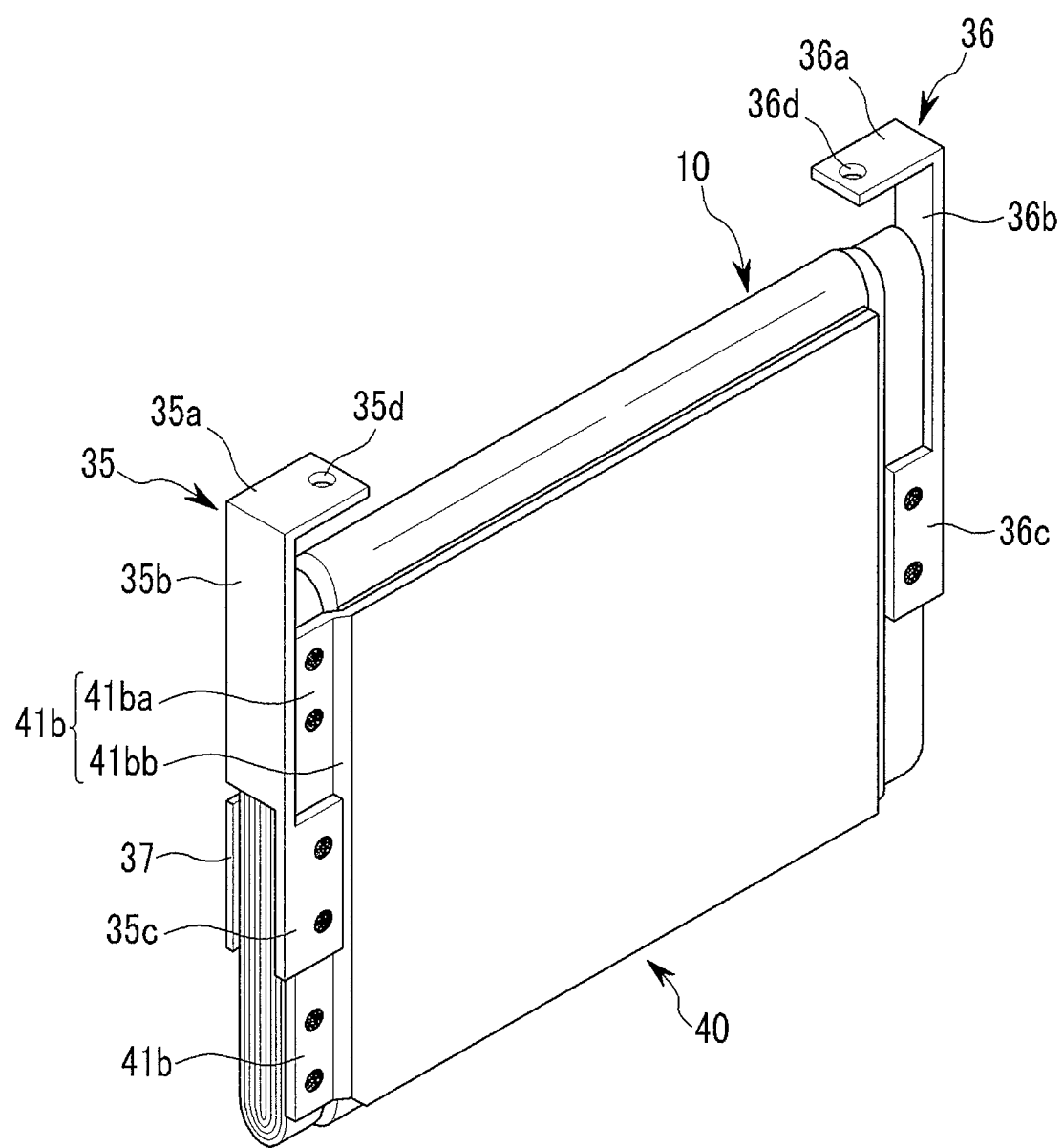
FIG. 4 is a perspective view illustrating an electrode assembly with a safety member attached thereon and current collecting tabs according to the first exemplary embodiment of the present invention.

FIG. 4 is a perspective view illustrating an electrode assembly with a safety member attached thereon and current collecting tabs according the first exemplary embodiment of the present invention.

Referring to FIG. 4, the positive electrode current collecting tab 35 and the negative electrode current collecting tab 36 according to the first exemplary embodiment are respectively bonded by welding to the positive electrode uncoated portion 11a (to which the safety member 40 and the auxiliary plate 37 are pre-welded) and negative electrode uncoated portion 12a of the electrode assembly 10.

The positive electrode current collecting tab 35 includes an upper support plate 35a (which may be referred to as a support) fixed to the positive electrode terminal 21, a lateral plate 35b (which may be referred to as a first plate) extending downward along a side edge of the electrode assembly 10 from the upper support plate 35a, and a welded plate 35c (which may be referred to as a second plate) bent at a right angle from the lateral plate 35b and attached to the positive electrode uncoated portion 11a by welding. A hole 35d for inserting the lower protrusion 21b of the positive electrode terminal 21 therein is formed in the upper support plate 35a.

The welded plate 35c is fixed to the positive electrode uncoated portion 11a by welding. The welded plate 35c may be bonded to the positive electrode uncoated portion 11a by various methods including ultrasonic welding and laser welding. In the embodiment shown in FIG. 4, the welded plate 35c is welded to the supporting protrusion 41b of the safety member 40 which, in turn, is welded to the positive electrode uncoated portion 11a. Therefore, in the embodiment shown in FIG. 4, the welded plate 35c is fixed to the positive electrode uncoated portion 11a by welding.

Therefore, the welded plate 35c is disposed to face the auxiliary plate 37, with the positive electrode uncoated portion 11a interposed therebetween, and is fixed by welding to a surface facing the opposite direction to the surface of the electrode assembly 10 on which the auxiliary plate 37 is disposed. The thickness of the auxiliary plate 37 is smaller than the thickness of the welded plate. The thickness of the auxiliary plate is 2/3 to 1/10 the thickness of the welded plate.

In the first exemplary embodiment, when the welded plate 35c is attached by welding to the positive electrode uncoated portion 11a fixed by welding to the auxiliary plate 37, the welded plate 35c can be easily fixed to the positive electrode uncoated portion 11a. In the first exemplary embodiment, if the supporting protrusion 41b provides support at the top and bottom and the auxiliary plate 37 provides support on the opposite side to which the welded plate 35c is welded, the welded plate 35c can be more easily welded to the positive electrode uncoated portion 11a.

The positive electrode current collecting tab 35 serves to transfer current collected in the positive electrode uncoated portion 11a to the positive electrode terminal 21. Because a large current flows through the positive electrode current collecting tab 35, it is preferable to form the positive electrode current collecting tab 35 with a relatively large thickness in order to reduce resistance. However, because more heat is required to bond the welded plate 35c having a large thickness to the positive electrode uncoated portion 11a, if much heat is transferred to the positive electrode uncoated portion 11a, the positive electrode uncoated portion 11a having a very small thickness may be stuck or torn. Due to this problem, it is difficult to increase the thickness of the positive electrode current collecting tab 35 without limit. However, in the first exemplary embodiment, if the positive electrode uncoated portion 11a is pre-welded to the auxiliary plate 37 and then the positive electrode uncoated portion 11a is attached to the positive electrode current collecting tab 35 by welding, the positive electrode uncoated portion 11a is stably supported on the auxiliary plate 37. Thus, even if the positive electrode current collecting tab 35 having sufficient (or significant) thickness and the positive electrode uncoated portion 11a are bonded together by welding, there is reduced likelihood that the positive electrode uncoated portion 11a will be stuck or torn.

A method of manufacturing the rechargeable battery as described above according to the first exemplary embodiment includes: electrically connecting the safety member 40 to the electrode assembly 10; attaching the auxiliary plate 37 to the positive electrode uncoated portion 11a; and attaching the current collecting tab 35 to the positive electrode uncoated portion 11a by welding, with the positive electrode uncoated portion 11a located between the current collecting tab 35 and the auxiliary plate 37.

In the electrical connection of the safety member 40 to the electrode assembly 10, the supporting protrusion 41b of the safety member 40 is attached to the positive electrode uncoated portion 11a, by welding. In the attaching of the auxiliary plate 37 to the uncoated portion 11a, the auxiliary plate 37 is attached and fixed to the positive electrode uncoated portion 11a by ultrasonic welding. In the fixing of the current collecting tab 35 to the positive electrode uncoated portion 11a by welding, the positive electrode uncoated portion 11a and the welded plate 35c are attached to each other by a method such as ultrasonic welding, with the welded plate 35c of the current collecting tab 35 being disposed on the supporting protrusions 41b such that the positive electrode uncoated portion 11a is positioned between the welded plate 35c and the auxiliary plate 37.

As stated above, the auxiliary plate 37 can be welded to the positive electrode uncoated portion 11a before the current collecting tab 35 is welded thereto. Optionally, the auxiliary plate 37 and the welded plate 35c may be simultaneously welded, with the auxiliary plate 37 and the welded plate 35c disposed with the positive electrode uncoated portion 11a interposed therebetween. In this case, as the auxiliary plate 37 and the welded plate 35c simultaneously apply pressure to the positive electrode uncoated portions 11a, the gaps between the thin metal films of the positive electrode uncoated portions 11a become smaller. As a result, heat can be easily transferred to the stacked thin metal films of the positive electrode uncoated portions 11a.

Figure 5:
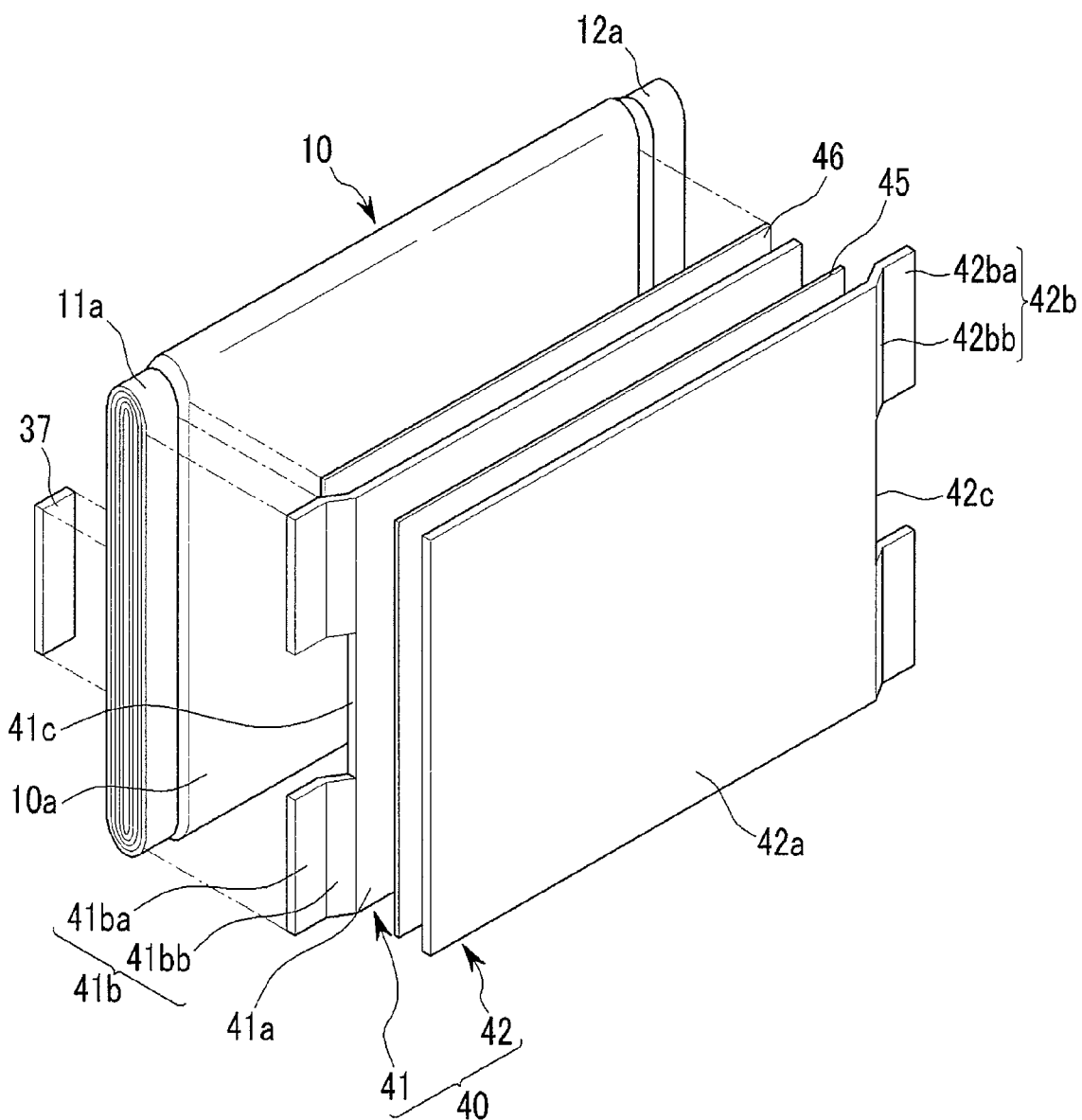
FIG. 5 is an exploded perspective view illustrating an electrode assembly and a safety member according the second exemplary embodiment of the present invention.

FIG. 5 is an exploded perspective view illustrating an electrode assembly and a safety member according to the second exemplary embodiment of the present invention.

Referring to FIG. 5, the safety member 40 includes a first metal plate 41 (which may be referred to as an electric conductive plate) electrically connected to the positive electrode 11, a second metal plate 42 (which may be referred to as an electric conductive plate) electrically connected to the negative electrode 12, a first film 45 disposed between the first metal plate 41 and the second metal plate 42, and a second film 46 disposed between the first metal plate 41 and the electrode assembly 10.

The first metal plate 41 is closely contacted with the flat surface 10a of the electrode assembly 10, with the second film 46 interposed therebetween, and the second metal plate 42 is closely contacted with the first metal plate 41 with the first film 45 interposed therebetween. The first metal plate 41 is attached to the positive electrode uncoated portion 11a by welding, and the second metal plate 42 is attached to the negative electrode uncoated portion 12a by welding.

Although the second exemplary embodiment has been described with respect to the case where the first metal plate 41 is attached to the positive electrode uncoated portion 11a by welding, embodiments of the present invention are not limited thereto, and the second metal plate 42 may be attached to the positive electrode uncoated portion 11a by welding. Similarly, the first metal plate 41 may be attached to the negative electrode uncoated portion 12a by welding.

According to the second exemplary embodiment, the first metal plate 41 is made of the same material as the positive electrode current collector (e.g., aluminum), and the second metal plate 42 is made of the same material as the negative electrode current collector (e.g., copper). The second film 46 and the first film 45 are made of a polymer material having electrical insulation.

The first metal plate 41 includes a flat plate portion 41a closely contacted with the flat surface 10a of the electrode assembly 10 and supporting protrusions 41b protruding from side edges of the flat plate portion 41a.

The flat plate portion 41a has a rectangular plate-like shape, and has a width corresponding to that of the flat surface 10a of the electrode assembly 10.

Two supporting protrusions 41b are spaced apart from each other in the height direction of the flat plate portion 41a, and a cut-out portion 41c is formed between the supporting protrusions 41b. The supporting protrusions 41b according to the second exemplary embodiment are respectively formed on upper and lower ends of the flat plate portion 41a, and the cut-out portion 41c is positioned in the center of the height direction of the flat plate portion 41a.

Each of the supporting protrusions 41b includes a welded portion 41ba attached to the positive electrode uncoated portion 11a by ultrasonic welding, etc., and a joining portion 41bb formed between the flat plate portion 41a and the welded portion 41ba. The welded portion 41ba is pre-welded to the positive electrode uncoated portion 11a to support the positive electrode uncoated portion 11a. The positive electrode uncoated portion 11a includes a plurality of thin metal films having low strength. If the positive electrode uncoated portion 11a is fixed to the supporting protrusions 41b by welding, the thin metal films of the positive electrode uncoated portion 11a can be densely arranged, thus rapidly transferring welding heat to the stacked thin metal films of the positive electrode uncoated portion 11a. If the thin metal films of the positive electrode uncoated portion 11a are not densely arranged and the gaps between the thin metal films of the positive electrode uncoated portion 11a are large, heat is concentrated only on some thin metal films of the positive electrode uncoated portion 11a, and as a result, the thin metal films of the positive electrode uncoated portion may be stuck together or the stacked thin metal films of the positive electrode uncoated portion 11a may not be bonded together over their whole area.

The joining portion 41bb is formed inclined toward the inside of the electrode assembly 10, and supports the positive electrode uncoated portion 11a. The positive electrode uncoated portion 11a has a smaller thickness than that of the positive electrode coated portion, so the positive electrode uncoated portion 11a is formed inclined at a region adjacent to the positive electrode coated portion, and the joining portion 41bb supports the inclined region of the positive electrode uncoated portion 11a.

Similar to the first metal plate 41, the second metal plate 42 includes a flat plate portion 42a closely contacted with the first metal plate 41, and supporting protrusions 42b protruding from side edges of the flat plate portion 42a.

The flat plate portion 42a has a rectangular plate-like shape, and has a width corresponding to that of the flat surface 10a of the electrode assembly 10. Two supporting protrusions 42b are spaced apart from each other in the height direction of the flat plate portion 42a, and a cut-out portion 42c is formed between the supporting protrusions 42b.

Each of the supporting protrusions 42b includes a welded portion 42ba attached to the negative electrode uncoated portion 12a by ultrasonic welding, etc., and a joining portion 42bb formed between the flat plate portion 42a and the welded portion 42ba. The welded portion 42ba is pre-welded to the negative electrode uncoated portion 12a to support the negative electrode uncoated portion 12a. The joining portion 42bb is formed inclined toward the inside of the electrode assembly 10, and supports the negative electrode uncoated portion 12a.

If the supporting protrusions 42b are pre-welded to the negative electrode uncoated portion 12a, the negative electrode uncoated portions 12a are fixed to the supporting protrusions 42b, thus maintaining their shape while having rigidity.

In the electrode assembly 10, an auxiliary plate 37 is provided on the opposite surface to the region where the cut-out portion 41c of the first metal plate 41 is formed, and another auxiliary plate is also provided on the opposite surface to the region where the cut-out portion 42c of the second metal plate 42 is formed (e.g., the auxiliary plate 37 is positioned to oppose the positive electrode current collecting tab 35 with the positive uncoated portion 11a therebetween). Here, the auxiliary plates (including auxiliary plate 37) are pre-welded to the positive electrode uncoated portion 11a and the negative electrode uncoated portion 12a, respectively. The auxiliary plates may made of the same materials as their corresponding electrode current collectors (e.g. aluminum for the auxiliary plate coupled to positive uncoated portion and copper for the auxiliary plate coupled to the negative uncoated portion).

If a conductive foreign object such as a nail or a screw enters the rechargeable battery 100 from the outside, the positive electrode 11 and the negative electrode 12 are short circuited by the conductive foreign object and this may generate much heat and may cause the rechargeable battery to ignite or explode.

However, in the case that the safety member 40 is provided as in the second exemplary embodiment, if a nail or screw enters the rechargeable battery from the outside, the first metal plate 41 is short circuited from the negative electrode 12 and the second metal plate 42 is short circuited from the positive electrode 11, thereby safely discharging stored current without ignition (e.g., such that the short circuit occurs across the safety plates outside of the electrode assembly).

As such, according to the second exemplary embodiment, when there is a risk of short circuit due to the intrusion of a conductive foreign object from the outside, the risk of ignition is reduced or eliminated by discharging current, thus improving the safety of the rechargeable battery 100.

Figure 6:
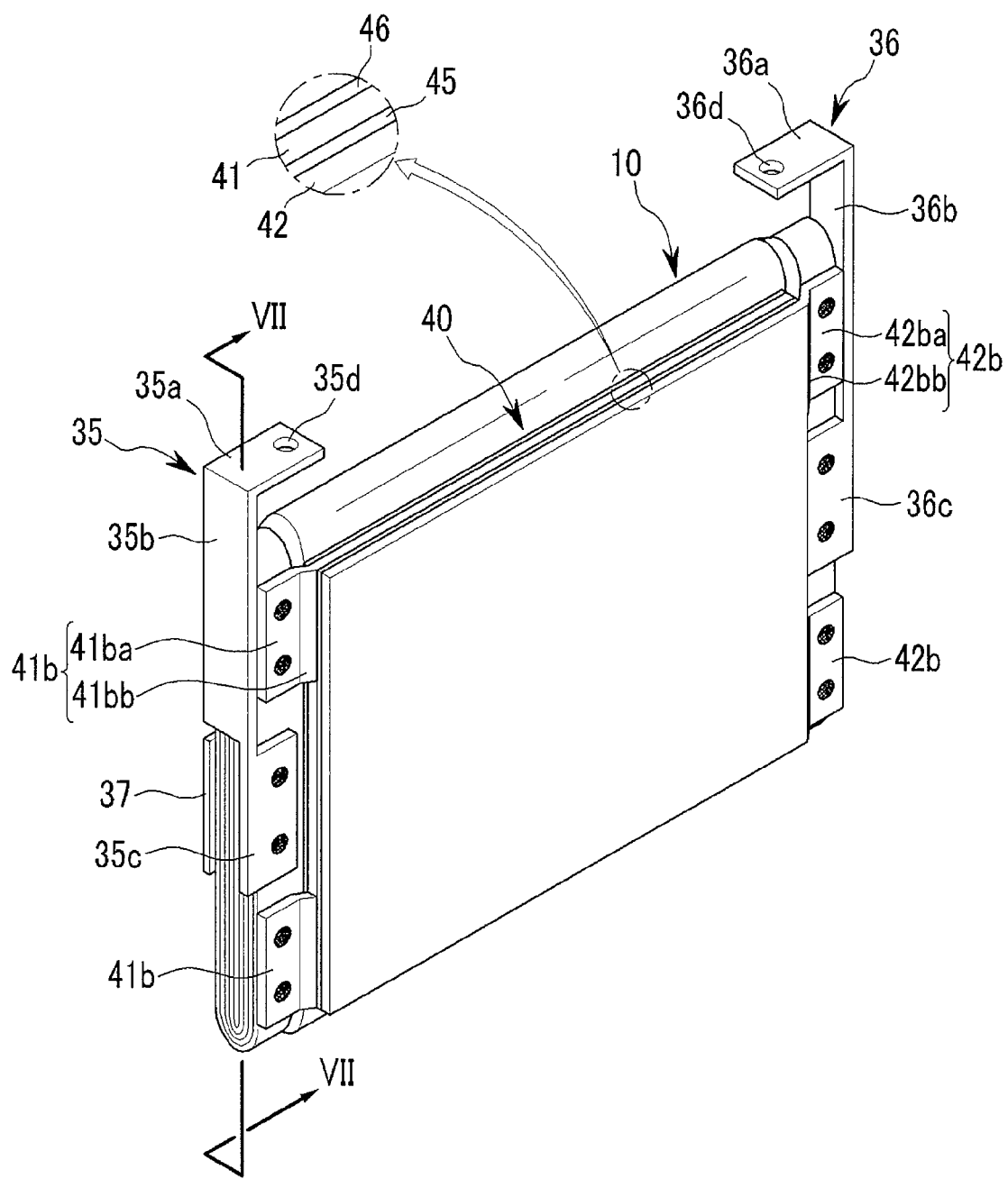
FIG. 6 is an exploded perspective view illustrating an electrode assembly with a safety member attached thereon and current collecting tabs according the second exemplary embodiment of the present invention.
Figure 7:
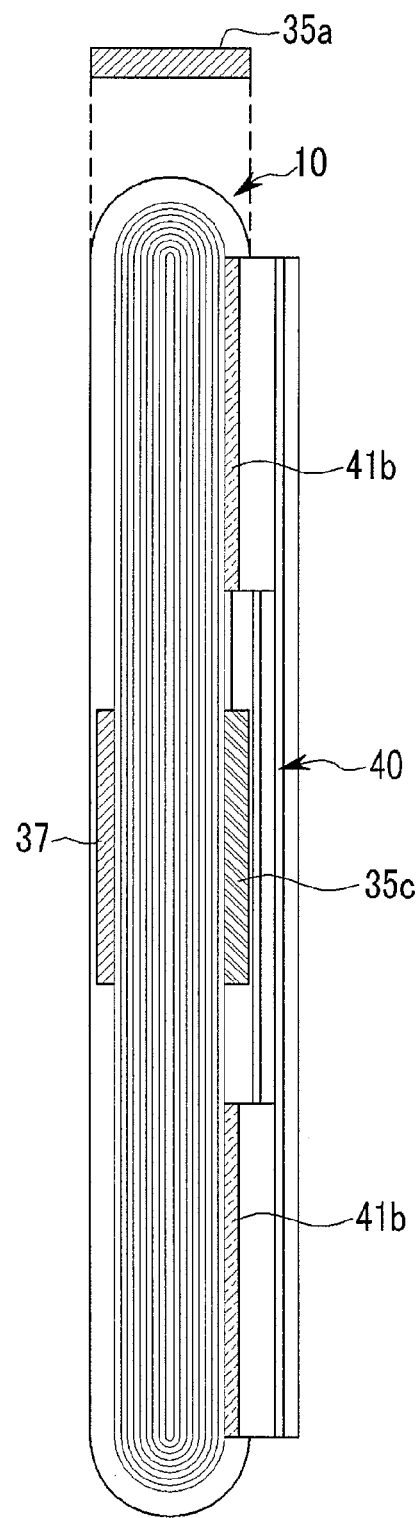
FIG. 7 is a cross-sectional view taken along line VII-VII in FIG. 6.

FIG. 6 is a perspective view illustrating an electrode assembly with a safety member attached thereon and current collecting tabs according to the second exemplary embodiment of the present invention, and FIG. 7 is a cross-sectional view taken along line VII-VII in FIG. 6.

Referring to FIG. 6 and FIG. 7, the positive electrode current collecting tab 35 and the negative electrode current collecting tab 36 according to the second exemplary embodiment are respectively bonded by welding to the positive electrode uncoated portion 11a and negative electrode uncoated portion 12a of the electrode assembly 10 to which the safety member 40 and the auxiliary plates (including auxiliary plate 37) are pre-welded.

The positive electrode current collecting tab 35 includes an upper support plate 35a (which may be referred to as a support) fixed to the positive electrode terminal 21, a lateral plate 35b (which may be referred to as a first plate) extending downward along a side edge of the electrode assembly 10 from the upper support plate 35a, and a welded plate 35c (which may be referred to as a second plate) bent at a right angle from the lateral plate 35b and attached to the positive electrode uncoated portion 11a by welding. A hole 35d for inserting the lower protrusion 21b of the positive electrode terminal 21 therein is formed in the upper support plate 35a.

The welded plate 35c is inserted into the cut-out portion 41c between the supporting protrusions 41b, being disposed in parallel with the positive electrode uncoated portion 11a, and is fixed to the positive electrode uncoated portion 11a by welding. The welded plate 35c may be bonded to the positive electrode uncoated portion 11a by various suitable methods including ultrasonic welding and laser welding.

Therefore, the welded plate 35c is disposed to face the auxiliary plate 37, with the positive electrode uncoated portion 11a interposed therebetween, and is fixed by welding to a surface facing the opposite direction to the surface of the electrode assembly 10 on which the auxiliary plate 37 is disposed. The thickness of the auxiliary plate 37 is smaller than the thickness of the welded plate. The thickness of the auxiliary plate may be 2/3 to 1/10 the thickness of the welded plate.

In the second exemplary embodiment, when the welded plate 35c is attached by welding (or welded) to the positive electrode uncoated portion 11a, which is fixed by it being welded to the auxiliary plate 37, the welded plate 35c can be easily fixed to the positive electrode uncoated portion 11a. Particularly, in the second exemplary embodiment, if the supporting protrusions 41b provide support at the top and bottom and the auxiliary plate 37 provides support on the opposite side to which the welded plate 35c is welded, the welded plate 35c can be more easily welded to the positive electrode uncoated portion 11a.

The positive electrode current collecting tab 35 serves to transfer current collected in the positive electrode uncoated portion 11a to the positive electrode terminal 21. Because a large current flows through the positive electrode current collecting tab 35, it is preferable to form the positive electrode current collecting tab 35 with a relatively large thickness in order to reduce resistance. However, because more heat is required to bond the welded plate 35c having a large thickness to the positive electrode uncoated portion 11a, if much heat is transferred to the positive electrode uncoated portion 11a, the positive electrode uncoated portion 11a having a very small thickness may be stuck or torn. Therefore, it is difficult to significantly increase the thickness of the positive electrode current collecting tab 35 without limit. However, as in the second exemplary embodiment, if the positive electrode uncoated portion 11a is pre-welded to the auxiliary plate 37 and then the positive electrode uncoated portion 11a is attached to the positive electrode current collecting tab 35 by welding, the positive electrode uncoated portion 11a is stably supported on the auxiliary plate 37. Thus, when the positive electrode current collecting tab 35 having sufficient (or significant) thickness is welded to the positive electrode uncoated portion 11a, there is a reduced likelihood that the positive electrode uncoated portion 11a will be stuck or torn.

The negative electrode current collecting tab 36 includes an upper support plate 36a fixed to the negative electrode terminal 22, a lateral plate 36b extending downward along a side edge of the electrode assembly 10 from the upper support plate 36a, and a welded plate 36c bent at a right angle from the lateral plate 36b and attached to the negative electrode uncoated portion 12a by welding. A hole 36d for inserting the lower protrusion 22b of the negative electrode terminal 22 therein is formed in the upper support plate 36a.

The welded plate 36c is inserted into the cut-out portion 42c between the supporting protrusions 42b, being disposed in parallel with the negative electrode uncoated portion 12a, and is fixed to the negative electrode uncoated portion 12a by welding. Similar to the positive electrode current collecting tab 35, the welded plate 36c of the negative electrode uncoated portion 12a is disposed to face a second auxiliary plate (similar to the auxiliary plate 37 fixed to the positive electrode uncoated portion 11a), with the negative electrode uncoated portion 12a interposed therebetween. The second auxiliary plate is pre-welded to the negative electrode uncoated portion 12a. The second auxiliary plate may be made of the same material as the negative electrode current collector (e.g., copper).

Accordingly, the negative electrode current collecting tab 36 can be easily welded to the negative electrode uncoated portion 12a while the second auxiliary plate 37 supports the negative electrode uncoated portion 12a.

A method of manufacturing the rechargeable battery as described above according to an exemplary embodiment includes: electrically connecting the safety member 40 to the electrode assembly 10; attaching the auxiliary plates (e.g., auxiliary plate 37) to the uncoated portions 11a and 12a; and attaching the current collecting tabs 35 and 36 to the uncoated portions 11a and 12a by welding, with the uncoated portions 11a and 12a located between the current collecting tabs 35 and 36 and the auxiliary plates (including the auxiliary plate 37).

In the electrical connection of the safety member 40 to the electrode assembly 10, the supporting protrusions 41b and 42b of the safety member 40 are attached to the positive electrode uncoated portion 11a and the negative electrode uncoated portion 12a, respectively, by welding. In the attaching of the auxiliary plates to the uncoated portions 11a and 12a, the auxiliary plates are attached and fixed to the uncoated portions 11a and 12a by ultrasonic welding (e.g., the auxiliary plate 37 is ultrasonically welded to the uncoated portion 11a). In the fixing of the current collecting tabs 35 and 36 to the uncoated portions 11a and 12a by welding, the uncoated portions 11a and 12a and the welded plates 35c and 36c are attached to each other by a method such as ultrasonic welding, with the welded plates 35c and 36c of the current collecting tabs 35 and 36 being disposed between the supporting protrusions 42b and 41b such that the uncoated portions 11a and 12a are positioned between the welded plates 35c and 36c and the auxiliary plates.

As stated above, the auxiliary plates can be welded to the uncoated portions 11a and 12a before the current collecting tabs 35 and 36 are welded thereto. Optionally, the auxiliary plates and the welded plates 35c and 36c may be simultaneously welded (e.g., to the uncoated portions 11a and 12a), with the auxiliary plates and the welded plates 35c and 36c disposed with the uncoated portions 11a and 12a interposed therebetween (e.g., the auxiliary plate 37 and the welded plate 35c may be disposed with the uncoated portion 11a therebetween). In this case, as the auxiliary plates and the welded plates 35c and 36c simultaneously apply pressure to (opposite sides of) the uncoated portions 11a and 12a, the gaps between the uncoated portions 11a and 12a become smaller. As a result, heat can be easily transferred to the stacked uncoated portions 11a and 12a.

Figure 8:
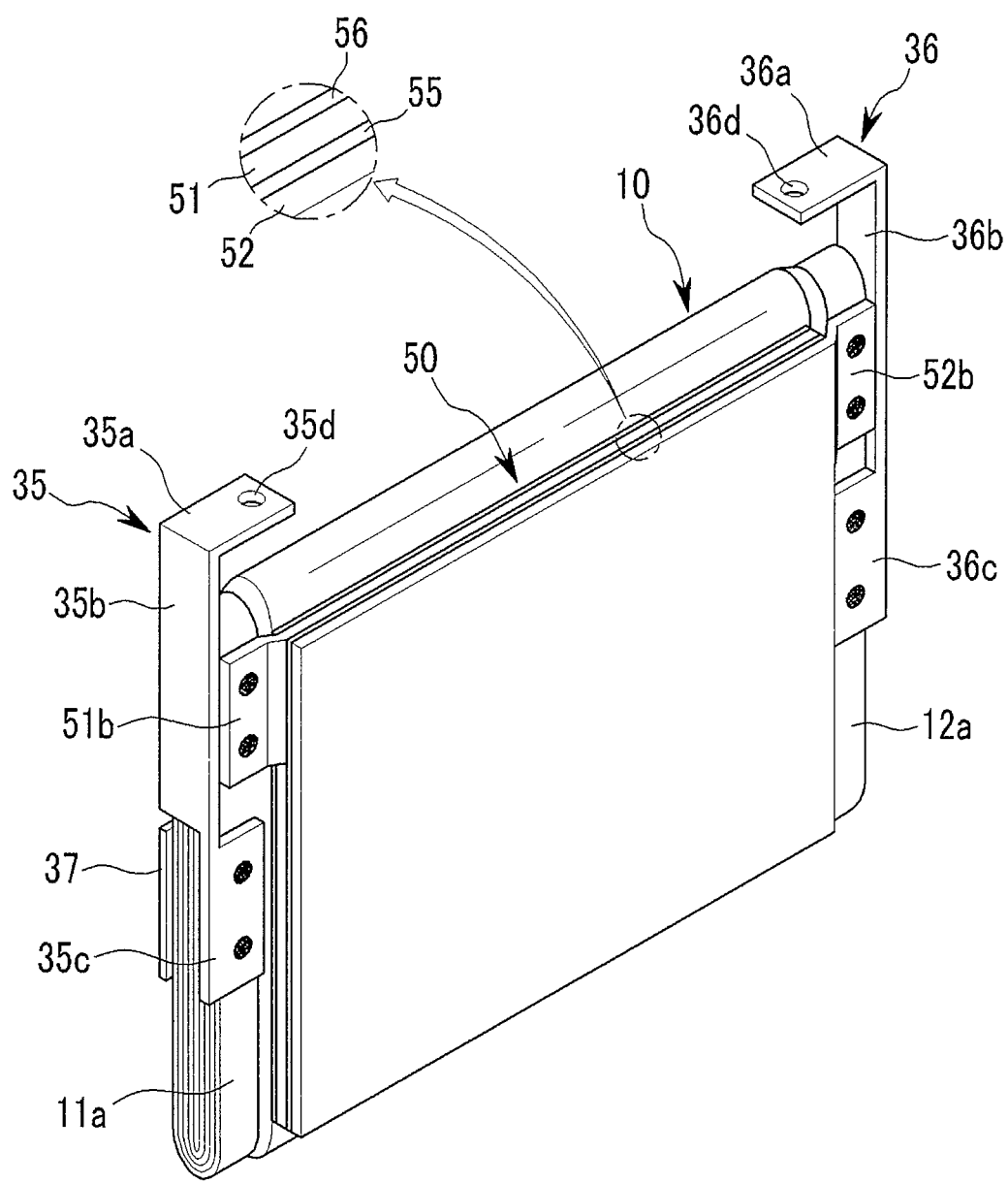
FIG. 8 is a perspective view illustrating an electrode assembly, a safety member, and current collecting tabs of a rechargeable battery according to a third exemplary embodiment of the present invention.

FIG. 8 is a perspective view illustrating an electrode assembly, a safety member, and current collecting tabs of a rechargeable battery according to a third exemplary embodiment of the present invention.

Referring to FIG. 8, the rechargeable battery according to the third exemplary embodiment has substantially the same structure as the rechargeable battery according to the second exemplary embodiment except for the structure of a safety member 50, so the description of the same structure is not provided again.

The safety member 50 according to the third exemplary embodiment includes a first metal plate 51 electrically connected to a positive electrode 11, a second metal plate 52 electrically connected to a negative electrode 12, a first film 55 disposed between the first metal plate 51 and the second metal plate 52, and a second film 56 disposed between the first metal plate 51 and the electrode assembly 10.

The first metal plate 51 includes a flat plate portion 51a closely contacted with a flat surface 10a of the electrode assembly 10, and a supporting protrusion 51b protruding from a side edge of the flat plate portion 51a and attached to a positive electrode uncoated portion 11a by welding. One supporting protrusion 51b is formed at an upper portion of the side edge of the flat plate portion 51a, and a welded plate 35c of a positive electrode current collecting tab 35 is attached to the positive electrode uncoated portion 11a below the supporting protrusion 51b by welding. Although the third exemplary embodiment illustrates that the supporting protrusion 51b is disposed at an upper portion of the side edge, embodiments of the present invention are not limited thereto, and the supporting protrusion may be positioned at a lower portion of the side edge of the flat plate portion and the welded plate may be attached above the supporting protrusion. The welded plate 35c is attached by welding, with the positive electrode uncoated portion 11a positioned between the welded plate 35c and the auxiliary plate 37.

The second metal plate 52 includes a flat plate portion 52a closely contacted with the flat plate portion 51a of the first metal plate 51, and a supporting protrusion 52b protruding from a side edge of the flat plate portion 52a and attached to the negative electrode uncoated portion 12a by welding. One supporting protrusion 52b is formed at an upper portion of the side edge of the flat plate portion 52a. Although the third embodiment illustrates that the supporting protrusion 52b is disposed at an upper portion of the side edge, embodiments of the present invention are not limited thereto, and the supporting protrusion may be positioned at a lower portion of the side edge of the flat plate portion and the welded plate may be attached above the supporting protrusion. The welded plate 36c is attached by welding, with the negative electrode uncoated portion 12a positioned between the welded plate 36c and the auxiliary plate.

The auxiliary plate 37 is attached by welding to the surface of the positive electrode uncoated portion 11a, which faces the opposite direction to the surface on which the supporting protrusion 51b is attached, below the supporting protrusion 51b. Moreover, the welded plate 35c of the positive electrode current collecting tab 35 is attached below the supporting protrusion 51b. That is, the welded plate 35c is attached by welding to the positive electrode uncoated portion 11a supported on the auxiliary plate 37, with the positive electrode uncoated portion 11a positioned between the welded plate 35c and the auxiliary plate 37.

The second metal plate 52 includes a flat plate portion 52a closely contacted with the flat surface 10a of the electrode assembly 10, and a supporting protrusion 52b protruding from a side edge of the flat plate portion 52a toward the negative electrode uncoated portion 12a and attached to the negative electrode uncoated portion 12a by welding. Further, a welded plate 36c of a negative electrode current collecting tab 36 is attached below the supporting protrusion 52b. That is, the welded plate 36c is attached to the negative electrode uncoated portion 12a supported on the auxiliary plate 37, with the negative electrode uncoated portion 12a positioned between the welded plate 36c and the auxiliary plate 37.

According to the third exemplary embodiment, even in the case that one supporting protrusion 51b and 52b is formed on each of the metal plates 51 and 52, the welded plates 35c and 36c can be easily welded to the respective uncoated portions 11a and 12a. Here, the uncoated portions 11a and 12a are supported by both of the supporting protrusion 51b and 52b and the corresponding auxiliary plates (e.g., the positive uncoated portion 11a is supported by the auxiliary plate 37).

Figure 9:
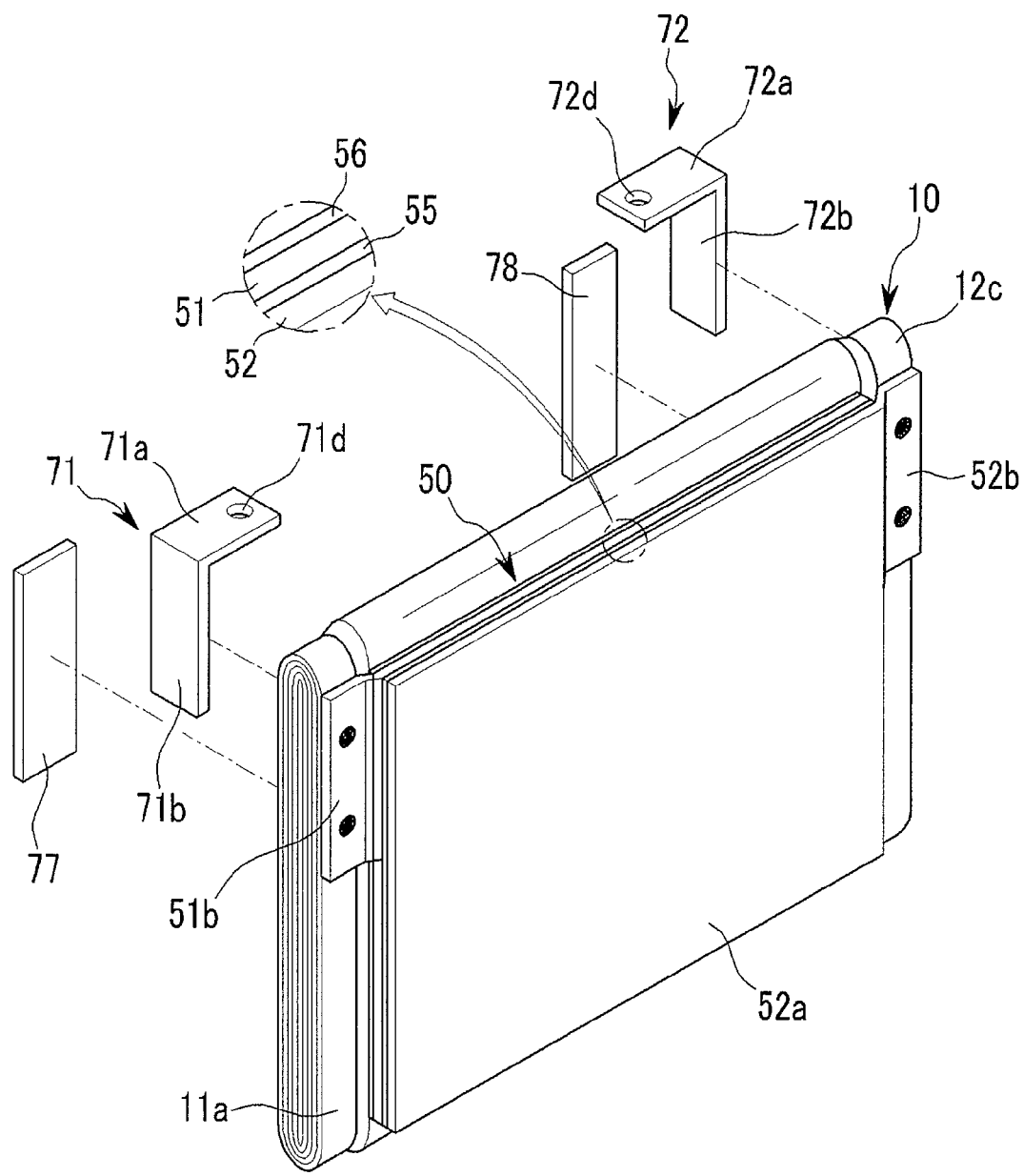
FIG. 9 is an exploded perspective view illustrating an electrode assembly and current collecting tabs of a rechargeable battery according to a fourth exemplary embodiment of the present invention.

FIG. 9 is an exploded perspective view illustrating an electrode assembly and current collecting tabs of a rechargeable battery according to a fourth exemplary embodiment of the present invention.

Referring to FIG. 9, the rechargeable battery according to the fourth exemplary embodiment has substantially the same structure as the rechargeable battery according to the third exemplary embodiment except for the structure of current collecting tabs 71 and 72, so the description of the same structure is not provided again.

The positive electrode current collecting tab 71 according to the fourth exemplary embodiment includes an upper support plate 71a (which may be referred to as a support plate) fixed to the positive electrode terminal 21 and a lateral plate 71b (which may be referred to as a first plate) extending downward along a side edge of the electrode assembly 10 from the upper support plate 71a and attached to the positive electrode uncoated portion 11a by welding. A hole 71d for inserting the lower protrusion 21b of the positive electrode terminal 21 therein is formed in the upper support plate 71a.

The negative electrode current collecting tab 72 includes an upper support plate 72a (which may be referred to as a support plate) fixed to the negative electrode terminal 22 and a lateral plate 72b (which may be referred to as a first plate) extending downward along a side edge of the electrode assembly 10 from the upper support plate 72a and attached to the negative electrode uncoated portion 12a by welding. A hole 72d for inserting the lower protrusion 22b of the negative electrode terminal 22 therein is formed in the upper support plate 72a.

A supporting protrusion 51b of a first support plate 51 is attached to the positive electrode 11a uncoated portion by welding, and a supporting protrusion 52b of a second support plate 52 is attached to the negative electrode uncoated portion by welding 12b.

An auxiliary plate 77 is attached by welding to the positive electrode uncoated portion 11a supported by the supporting protrusion 51b, facing the supporting protrusion 51b, with the positive electrode uncoated portion 11a interposed therebetween (e.g., the supporting protrusion 51b may be positioned to oppose the welded plate 71c of the current collecting tab 71 with the positive electrode uncoated portion 11a therebetween). Moreover, an auxiliary plate 78 is attached by welding to the negative electrode uncoated portion 12a supported by the supporting protrusion 52b, facing the supporting protrusion 52b, with the negative electrode uncoated portion 12a interposed therebetween.

The auxiliary plates 77 and 78 are attached by welding to the surface of the uncoated portions 11a and 12a facing the opposite direction to the surface to which the supporting protrusions 51b and 52b are welded. Therefore, since the pre-welded supporting protrusions 51b and 52b support the uncoated portions 11a and 12a, the auxiliary plates 77 and 78 can be more easily welded to the uncoated portion 11a and 12a.

Figure 10:
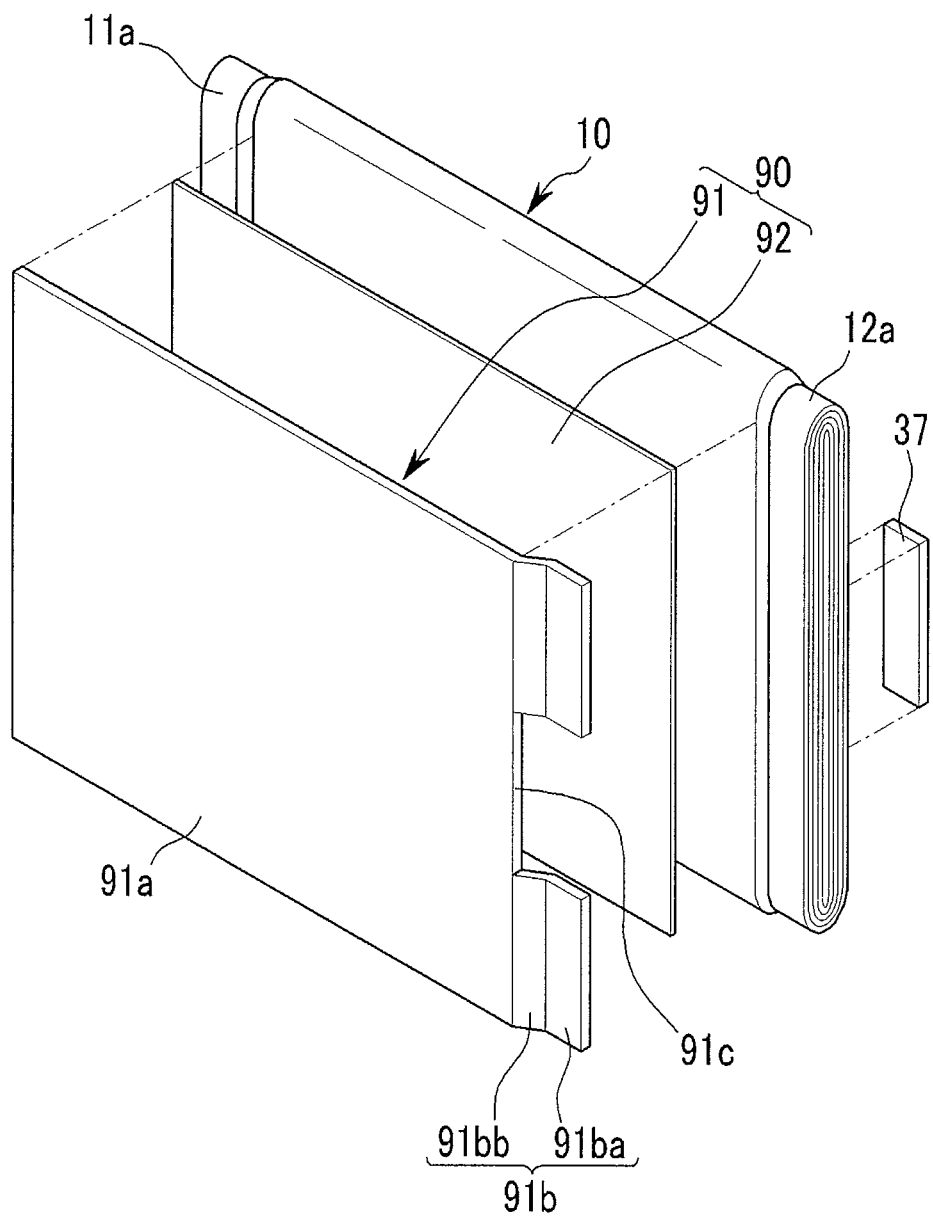
FIG. 10 is an exploded perspective view illustrating an electrode assembly and current collecting tabs of a rechargeable battery according to a fifth exemplary embodiment of the present invention.

FIG. 10 is an exploded perspective view illustrating an electrode assembly and current collecting tabs of a rechargeable battery according to a fifth exemplary embodiment of the present invention.

Referring to FIG. 10, the rechargeable battery according to the fifth exemplary embodiment has substantially the same structure as the rechargeable battery according to the first exemplary embodiment except for the structure of a safety member, so the description of the same structure is not provided again.

The safety member 90 according to the fifth exemplary embodiment includes a metal plate 91 electrically connected to a negative electrode 12, and a film 92 disposed between an electrode assembly 10 and the metal plate 91.

The metal plate 91 includes a flat plate portion 91a closely contacted with a flat surface 10a of the electrode assembly 10, and supporting protrusions 91b protruding from side edges of the flat plate portion 91a toward the negative electrode uncoated portion 12a. The supporting protrusions 91b protrude from upper and lower ends of the flat plate portion 91a, respectively, and a cut-out portion 91c, which is a spacing gap, is formed between the supporting protrusions 91b.

Each of the supporting protrusions 91b includes a welded portion 91ba attached to the negative electrode uncoated portion 12a by ultrasonic welding, etc., and a joining portion 91bb formed between the flat plate portion 91a and the welded portion 91ba. The welded portion 91ba is pre-welded to the negative electrode uncoated portion 12a to support the negative electrode uncoated portion 12a. Although the fifth exemplary embodiment has been described with respect to the case where the metal plate 91 is attached to the negative electrode uncoated portion 12a by welding, embodiments of the present invention are not limited thereto, and the metal plate may be electrically connected to the positive electrode 11 by welding the supporting protrusions to the positive electrode uncoated portion 11a.

An auxiliary plate 37 is provided on the opposite surface to the region where the cut-out portion 91c is formed, and the auxiliary plate 37 is pre-welded to the negative electrode uncoated portion 12a.

As in the first exemplary embodiment, a negative electrode current collecting tab is attached on the surface of the negative electrode uncoated portion 12a facing the opposite surface to the region where the auxiliary plate 37 is provided. The negative electrode current collecting tab is welded to the region where the auxiliary plate 37 is welded, and is welded to the negative electrode uncoated portion 12a, facing the auxiliary plate 37, with the negative electrode uncoated portion 12a interposed therebetween.

According to the fifth exemplary embodiment, in the event of intrusion of a conductive foreign object from the outside, the metal plate 91 and the positive electrode 11 are short circuited, thus rapidly discharging stored current. Moreover, the negative electrode current collecting tab is welded to the negative electrode uncoated portion 12a, with the negative electrode uncoated portion 12a supported by the supporting protrusions 91b and the auxiliary plate 27, thereby making welding easier.

Figure 11:
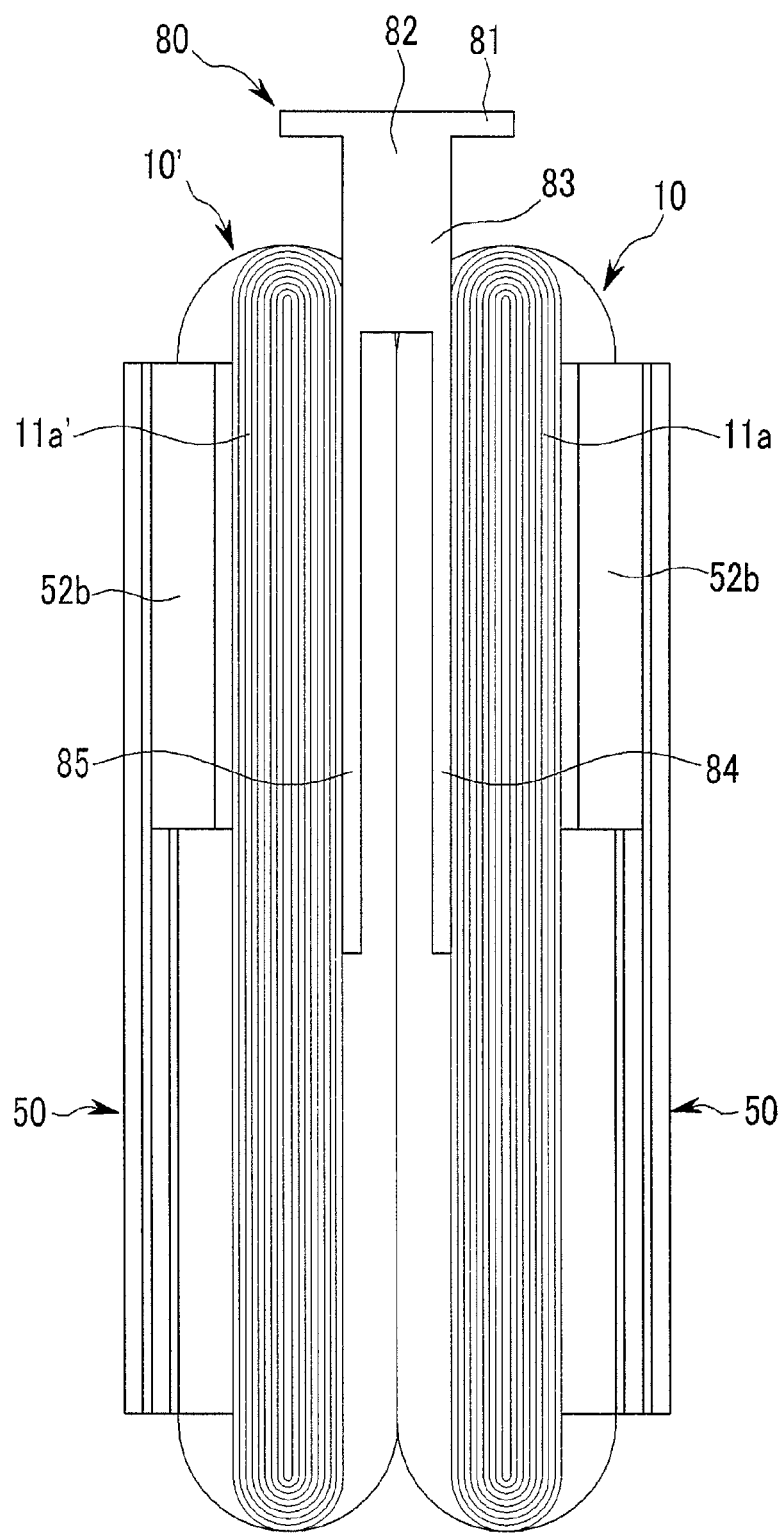
FIG. 11 is a side view illustrating a current collecting tab mounted on an electrode assembly of a rechargeable battery according to a sixth exemplary embodiment of the present invention.

FIG. 11 is a side view illustrating a current collecting tab mounted on an electrode assembly of a rechargeable battery according to a sixth exemplary embodiment of the present invention.

Referring to FIG. 11, the rechargeable battery according to the sixth exemplary embodiment has substantially the same structure as the rechargeable battery according to the fourth exemplary embodiment except for the provision of a plurality of electrode assemblies 10 and 10' inside a case and the structure of a current collecting tab 80, so the description of the same structure is not provided again.

The rechargeable battery according to the sixth exemplary embodiment includes a plurality of electrode assemblies 10 and 10' inserted into a case. A safety member 50 having the same structure as the safety member according to the fourth exemplary embodiment is provided on the outer surfaces of the electrode assemblies 10 and 10'. The safety member 50 is disposed on an outward one of the surfaces of each of the electrode assemblies 10 and 10'. The positive electrode current collecting tab 80 includes an upper support plate 81, a lateral plate 83 extending downward from the upper support plate 81, and welded plates 85 and 84 protruding downward and bent from the lateral plate 83. A negative electrode current collecting tab has substantially the same structure as the positive electrode current collecting tab, so the description of the same structure is not provided again.

The welded plates 85 and 84 are bent from both side edges of the lateral plate 83 so as to be parallel with positive electrode uncoated portions 11a and 11a' and attached to the positive electrode uncoated portions by welding.

Supporting protrusions 52b are attached by welding to the positive electrode uncoated portions 11a and 11a', and the welded plates 85 and 84 are attached by welding to the positive electrode uncoated portions 11a and 11a', with the positive electrode uncoated portions 11a and 11a' interposed between the welded plates 85 and 84 and the supporting protrusions 52b. In the sixth exemplary embodiment, if the positive electrode uncoated portions 11a and 11a' and the welded plates 85 and 84 are attached together, with the positive electrode uncoated portions 11a and 11a' stably supported by the supporting protrusions 52b, the positive electrode uncoated portions 11a and 11a' can be stably supported by the supporting protrusions 52b, thereby making welding easier.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

DESCRIPTION OF SYMBOLS

| | |
|---|---|
| 100: rechargeable battery | 10, 10': electrode assembly |
| 10a: flat surface | 10b: curved surface |
| 11: positive electrode | 12: negative electrode |
| 11a, 11'a: positive electrode uncoated portion | |
| 12a: negative electrode uncoated portion | |
| 13: separator | 20: cap assembly |
| 21: positive electrode terminal | |
| 22: negative electrode terminal | |
| 21a, 22a: terminal flange | 21b, 22b: lower protrusion |
| 24: washer | 25: upper gasket |
| 26: lower insulation member | 27: electrolyte injection hole |
| 23: lower gasket | 29: nut |
| 30: cap plate | 34: case |
| 35, 71, 80: positive electrode current collecting tab | |
| 36, 72: negative electrode current collecting tab | |
| 35a, 36a, 71a, 72a, 81: upper support plate | |
| 35b, 36b, 71b, 72b, 83: lateral plate | |
| 35c, 36c, 71c, 72c, 85, 84: welded plate | |
| 35d, 36d, 71d, 72d: hole | 37: auxiliary plate |
| 38: stopper | 39: vent member |
| 39a: notch | 40, 50, 90: safety member |
| 41, 51: first metal plate | 42, 52: second metal plate |
| 41a, 42a, 51a, 52a: flat plate portion | |
| 41b, 42b, 51b, 52b: supporting protrusion | |
| 41ba, 42ba: welded portion | 41bb, 42bb: joining portion |
| 41c, 42c: cut-out portion | 45, 55: first film |
| 46, 56: second film | |

What is claimed is:

1. A rechargeable battery comprising:
a case;

an electrode assembly housed in the case and comprising a first electrode, a second electrode, and a separator between the first electrode and the second electrode, the first electrode having a coated portion coated with a first active material and an uncoated portion absent the first active material;

a cap assembly physically coupled to the case and comprising a terminal electrically coupled to the electrode assembly;

a safety assembly housed in the case, the safety assembly comprising a first electric conductive plate of a first electrical polarity, a first supporting protrusion extending from the first electric conductive plate and physically coupled to the uncoated portion, and a second electric conductive plate of a second electrical polarity different from the first electrical polarity the first electric conductive plate and the second electric conductive plate both being on only a single side of the electrode assembly;

a current collecting tab electrically coupling the electrode assembly with the terminal and physically coupled to the uncoated portion; and a first auxiliary plate physically coupled to the uncoated portion at a surface of the uncoated portion opposite to where the first supporting protrusion is physically coupled to the uncoated portion.

2. The rechargeable battery of claim 1, wherein:

the electrode assembly has a flat surface and a curved surface, the first electric conductive plate is on the flat surface, and the cap assembly is on the curved surface, wherein the current collecting tab comprises a support extending along a first direction on the curved surface and a first plate extending from the support along a second direction on a side edge of the electrode assembly.

3. The rechargeable battery of claim 2, wherein the current collecting tab further comprises a second plate extending from the first plate along the first direction on a side surface of the uncoated portion extending from the flat surface.

4. The rechargeable battery of claim 3, wherein the first direction is perpendicular to the second direction.

5. The rechargeable battery of claim 1, wherein the first electric conductive plate is composed of a same material as that of the first electrode.

6. The rechargeable battery of claim 1, wherein the first auxiliary plate is composed of a same material as that of the first electrode.

7. The rechargeable battery of claim 1, wherein the first auxiliary plate is positioned to oppose the current collecting tab with the uncoated portion therebetween.

8. The rechargeable battery of claim 1, wherein the first supporting protrusion is physically coupled to the uncoated portion at a surface of the uncoated portion opposite to where the current collecting tab is physically coupled to the uncoated portion and positioned to oppose the current collecting tab with the uncoated portion therebetween.

9. The rechargeable battery of claim 1, wherein the first supporting protrusion comprises a plurality of supporting portions.

10. The rechargeable battery of claim 9, wherein the supporting portions define a cut out region therebetween.

11. The rechargeable battery of claim 10, wherein the first auxiliary plate is positioned to oppose the current collecting tab at the cut out region with the uncoated portion therebetween.

12. The rechargeable battery of claim 1, wherein
the second electric conductive plate is between the electrode assembly and the first electric conductive plate.

13. The rechargeable battery of claim 12, further comprising a second auxiliary plate,
wherein the second electrode has a coated portion coated with a second active material and an uncoated portion absent the second active material, and
wherein the second auxiliary plate is physically coupled to the uncoated portion of the second electrode.

14. The rechargeable battery of claim 13, wherein the second auxiliary plate is composed of a same material as that of the second electrode.

15. The rechargeable battery of claim 13, wherein the second auxiliary plate is composed of a different material than that of the first auxiliary plate.

16. The rechargeable battery of claim 13, wherein the safety assembly further comprises a second supporting protrusion integrally provided with the second electric conductive plate to extend from the second electric conductive plate and to be physically coupled to the uncoated portion of the second electrode.

* * * * *